(12) United States Patent
Osada

(10) Patent No.: US 6,317,652 B1
(45) Date of Patent: Nov. 13, 2001

(54) LEGGED MOBILE ROBOT

(75) Inventor: Taku Osada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,630

(22) Filed: Sep. 7, 1999

(30) Foreign Application Priority Data

Sep. 14, 1998 (JP) .................................................. 10-260129
Apr. 19, 1999 (JP) .................................................. 11-110555

(51) Int. Cl.⁷ .................................................. G06F 19/00
(52) U.S. Cl. .......................... 700/245; 700/253; 700/258; 318/568.1; 318/568.11; 318/568.12; 901/1; 901/9; 701/23
(58) Field of Search .................................... 700/245, 253, 700/258, 251, 260, 261, 264, 250, 247, 249; 318/568.1, 568.11, 568.12, 568.16, 568.2; 180/8.1, 8.6; 901/1, 9; 701/23, 124; 348/140; 356/71

(56) References Cited

U.S. PATENT DOCUMENTS

| | | | | |
|---|---|---|---|---|
| 5,034,812 | * | 7/1991 | Rawlings | 348/140 |
| 5,402,050 | * | 3/1995 | Ozawa | 318/568.12 |
| 5,416,393 | * | 5/1995 | Gomi et al. | 318/568.2 |
| 5,986,746 | * | 11/1999 | Metz et al. | 356/71 |

FOREIGN PATENT DOCUMENTS 5-93778   12/1993  (JP) .
11-10562   1/1999  (JP) .

OTHER PUBLICATIONS

Andersen et al., Augmented Models For Improving Vision Control of A Mobile Robot, 1994, IEEE, pp. 53–58.*
Delahoche et al., A Navigation System Based on an Omnidirectional Vision Sensor, 1997, IEEE, pp. 718–724.*
Bang et al., Sensor–Based Local Homing Using Omnidirectional Range And Intesity Sensing System For Indoor Mobile Robot Navigation, 1995, IEEE, pp. 542–548.*
Ishiguro et al., Multiple Vision Agents Navigating A Mobile Robot In A Real 'world, 1993, IEEE, pp. 772–777.*

* cited by examiner

Primary Examiner—William A. Cuchlinski, Jr.
Assistant Examiner—McDieunel Marc
(74) Attorney, Agent, or Firm—Arent Fox Kinter Plotkin & Kahn

(57) ABSTRACT

A legged mobile robot for accurately calculating the positional relationship between a leg and an obstacle to the walking of the robot has a base body and a plurality of legs operatively connected to the base body. A vision sensor mounted on the base body captures image data containing both an image of a portion of a foot of one of the legs and an image of an obstacle in the course of robot walking. The legged mobile robot calculates the positional relationship between the leg and the obstacle from the captured image data, and walks while recognizing the positional relationship as calculated between the obstacle and the foot.

8 Claims, 5 Drawing Sheets

LEGGED MOBILE ROBOT

BACKGROUND OF THE INVENTION

1. Field of the Invention

The present invention relates to a legged mobile robot which is capable of recognizing the positional relationship between its legs and an obstacle to its walking from image data captured through a vision sensor.

2. Description of the Related Art

Autonomous legged mobile robots have a vision sensor such as a CCD (Charge-Coupled Device) camera, for example. An autonomous legged mobile robot equipped with such a CCD camera recognizes the position of an obstacle present in the course of robot walking from image data obtained by the CCD camera, and walks in a manner to negotiate the recognized obstacle. In order to achieve a wider range of vision, the CCD camera is generally mounted on an upper end, e.g., a head, of the body of the legged mobile robot.

Legged mobile robots are expected to act in a three-dimensional space containing obstacles such as a staircase, etc., in which other types of robots such as wheeled robots cannot easily move. For a legged mobile robot to freely move in a three-dimensional space, it is necessary to accurately calculate the positional relationship between a leg of the robot, particularly, a foot to be landed on the floor and an obstacle present in the course of robot walking. However, since the legged mobile robot has a number of joints between the foot of the leg and the head thereof, it is difficult to accurately calculate the positional relationship between the foot and the obstacle.

In view of the above drawback, there has been proposed a legged mobile robot having a camera mounted on the foot of a leg thereof, as disclosed in Japanese laid-open utility model publication No. 5-93778. When the position of an obstacle to the legged mobile robot is recognized by the camera on the foot of the leg, the legged mobile robot can accurately calculate the positional relationship between the foot and the obstacle because the calculations are free of positioning errors of the joints of the robot.

However, the camera installed on the foot of the leg is disadvantageous in that the camera tends to be easily damaged or smeared by the environment in which the robot walks, and results in an increase in the weight of the leg that is apt to impair the walking performance of the robot.

SUMMARY OF THE INVENTION

According to the present invention, there is provided a legged mobile robot comprising a base body, a plurality of legs operatively connected to the base body, a vision sensor mounted on the base body, image input means for capturing image data via the vision sensor, and positional relationship calculating means for calculating the positional relationship between of an obstacle present in the course of robot walking and one of the legs from the image data captured by the image input means, so that the legged mobile robot can walk while recognizing the positional relationship between the obstacle and the leg as calculated by the positional relationship calculating means.

The position (attitude) of the leg of the legged mobile robot is recognized by the legged mobile robot itself. Therefore, when the position of the obstacle is recognized from the image data of the obstacle captured by the vision sensor, the positional relationship between the leg and the obstacle can basically be calculated. However, if the vision sensor is mounted on the base body of the legged mobile robot, then when the positional relationship between the foot and the obstacle is calculated, the position of the vision sensor with respect to the foot suffers a variation because positioning errors of a number of joints present between the foot and the visual sensor are added. As a result, the position of the obstacle calculated from the image data of the obstacle captured by the vision sensor also suffers a variation with respect to the position of the foot, and hence the positional relationship between the foot and the obstacle cannot accurately be calculated.

In view of the above difficulty, the positional relationship calculating means calculates the positional relationship between the obstacle and the leg from image data containing both images of a portion of the leg and the obstacle as captured by the image input means. Since the relative positional relationship between the obstacle and the leg is calculated directly from the image data containing the images of the portion of the leg and the obstacle, the positional relationship between the obstacle and the leg can accurately be calculated regardless of the positioning errors of the joints.

In order for the vision sensor to capture the image data containing the images of the portion of the leg and the obstacle, the vision sensor has to capture image data when both the portion of the leg and the obstacle can enter the visual field of the vision sensor. Depending on the attitude of the leg, however, both the portion of the leg and the obstacle may not enter the visual field of the vision sensor.

For example, when the vision sensor is to capture image data containing both images of the tip end of a foot, which is a portion of the leg, and an obstacle, if the visual field of the vision sensor is obstructed by the knee of the leg, then the foot does not enter the visual field of the vision sensor. When the vision sensor is to capture image data containing both images of the knee of a foot, which is a portion of the leg, and an obstacle, if the leg is positioned behind the base body, then the knee does not enter the visual field of the vision sensor. In order for both the portion of the leg and the obstacle to enter the visual field of the vision sensor, it is necessary to provide a space, in which the obstacle can be present, around the portion of the leg that has entered the visual field of the vision sensor.

If the portion of the leg does not enter the visual field of the vision sensor or there is no space, in which the obstacle could be present, around the portion of the leg that has entered the visual field of the vision sensor, then image data that is captured by the image input means does not contain both the image of the portion of the leg and the image of the obstacle, or contains only one of those images. Even when the positional relationship calculating means processes the image data which does not contain both the image of the portion of the leg and the image of the obstacle for the purpose of calculating the positional relationship between the leg and the obstacle, the processing is simply a waste of processing time.

According to the present invention, the legged mobile robot further comprises positional relationship recognizing means for recognizing the positional relationship between a visual field of the vision sensor and the leg 3, the image input means comprising means for capturing the image data via the vision sensor when both the portion of the leg and the obstacle can enter the visual field of the vision sensor as determined by the positional relationship recognizing means.

With the above arrangement, the positional relationship calculating means processes only image data which possibly contains both an image of a portion of the leg and an image of an obstacle for calculating the positional relationship between the leg and the obstacle. Therefore, wasteful processing is prevented from being performed.

The legged mobile robot further comprises walking operation modifying means for modifying details of subsequent walking operation of the legged mobile robot depending on the positional relationship between the leg and the obstacle as calculated by the positional relationship calculating means.

For example, when the legged mobile robot walks up a staircase, the legged mobile robot may basically walks with a constant leg stroke depending on the width of steps of the staircase. However, the landed position of a leg on the staircase may be displaced toward the edge of a step or a leg may face the staircase at a varied angle due to slippage of the leg when it is landed on the staircase. If the legged mobile robot continues to walk with the constant leg stroke, then the leg may possibly tend to step off the staircase. The walking operation modifying means modifies the walking operation to cause the leg to be landed next time centrally on a step of the staircase or correct the angle at which the leg faces the staircase, depending on the positional relationship between the leg and the obstacle as calculated by the positional relationship calculating means. In this manner, the legged mobile robot can walk stably.

Moreover, the positional relationship calculating means comprises means for calculating the positional relationship between the leg and the obstacle at least once after the leg is lifted and until the leg is landed during walking operation of the legged mobile robot.

In as much as the positional relationship calculating means necessarily calculates the positional relationship between the leg and the obstacle after the leg is lifted and until the leg is landed during walking operation of the legged mobile robot, the legged mobile robot can supervise and correct the walking operation at short intervals.

The image input means comprises means for holding topographic information in advance and means for capturing the image data via the vision sensor when an area in which the obstacle is expected to enter the visual field of the vision sensor is reached based on the topographic information during walking operation of the legged mobile robot.

The above arrangement is effective to reduce the possibility that image data is captured by the image input means regardless of the obstacle failing to enter the visual field of the vision sensor and the positional relationship calculating means performs wasteful image processing.

The leg has a mark on a portion thereof which can enter the visual field of the vision sensor, the positional relationship calculating means comprising means for extracting an edge of the mark from the image data thereby to calculate the position of the leg.

The position of the leg can generally be calculated from the image data by extracting an edge of the leg from the image data. However, the accuracy with which to extract the edge of the leg tends to vary due to the relationship between the color of the leg and the color of the surface which is contacted by the leg, and illuminating conditions. To eliminate the above drawback, an edge of the mark, which is less susceptible to the color relationship and illuminating conditions, is extracted to calculate the position of the mark, and the position of the leg is calculated from the position of the mark. In this manner, the position of the leg can be calculated with high accuracy.

The legged mobile robot further comprises an auxiliary vision sensor having a visual field wider than a visual field of the vision sensor, the image input means comprising means for entering topographic image data in the course of robot walking via the auxiliary vision sensor, recognizing the position of the obstacle from the topographic image data, and capturing the image data via the vision sensor when an area in which the obstacle enters the visual field of the vision sensor is reached.

Therefore, the possibility that the image data is captured before the obstacle enters the visual field of the camera and the positional relationship calculating means performs wasteful image processing is reduced.

When the vision sensor malfunctions or a lens of the vision sensor is smeared, the image input means is unable to capture the image data via the vision sensor. The legged mobile robot then fails to walk while the positional relationship calculating means is calculating the positional relationship between the obstacle and the leg.

To avoid the above drawback, the leg has a foot for contacting a floor, and the legged mobile robot further comprises a force sensor for detecting an acting force and a moment in a predetermined direction based on a resistive force applied to the foot from the floor, and contacted state recognizing means for recognizing a direction and/or position in which the foot contacts a ridge of the obstacle, based on output data from the force sensor. If the image input means fails to capture the image data via the vision sensor, the legged mobile robot walks while recognizing the positional relationship between the obstacle and the leg from the direction and/or position in which the foot contacts the ridge of the obstacle, as recognized by the contacted state recognizing means.

With the above arrangement, even when the above image data cannot be captured while the legged mobile robot is walking, the legged mobile robot can continue its walking operation while recognizing the positional relationship between the obstacle and the leg from the direction and/or position in which the foot contacts the ridge of the obstacle, as recognized by the contacted state recognizing means.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
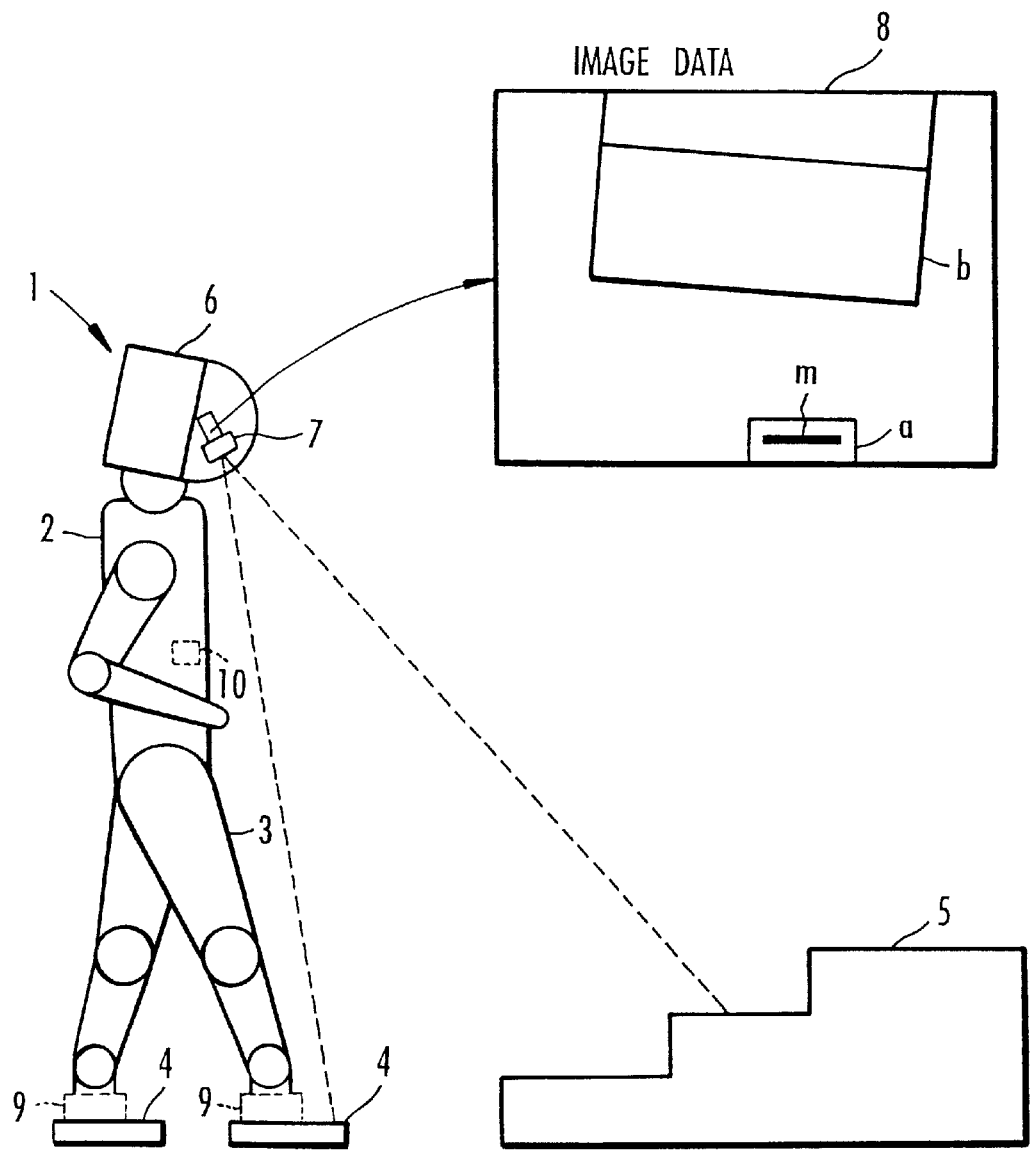
FIG. 1 is a schematic view illustrative of a process of acquiring image data with a vision sensor on a legged mobile robot according to the present invention.
Figure 2:
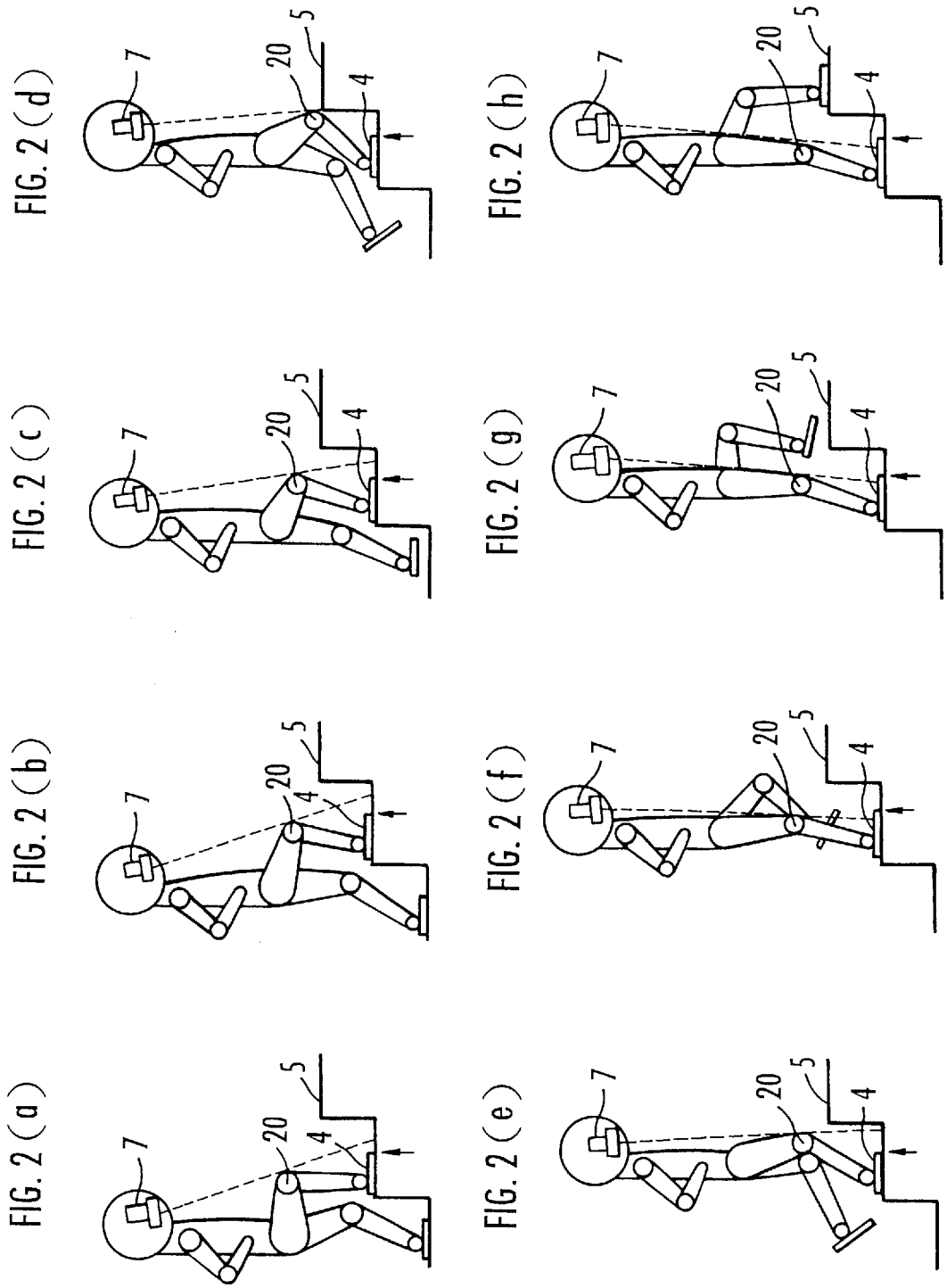
FIGS. 2(a) through 2(h) are schematic views illustrative of the timing to capture image data with the vision sensor.

As shown in FIG. 1, a legged mobile robot 1 according to the present invention is a biped robot and comprises a base body 2 and two legs 3. The legs 3 have knee joints and ankle joints which can be bent by actuators such as motors (not shown). The legged mobile robot 1 also has a CCD camera 7 (corresponding to a vision sensor according the present invention) mounted on a head 6 of the base body 2 for recognizing the position of an obstacle present in the course of robot walking.

Figure 3:
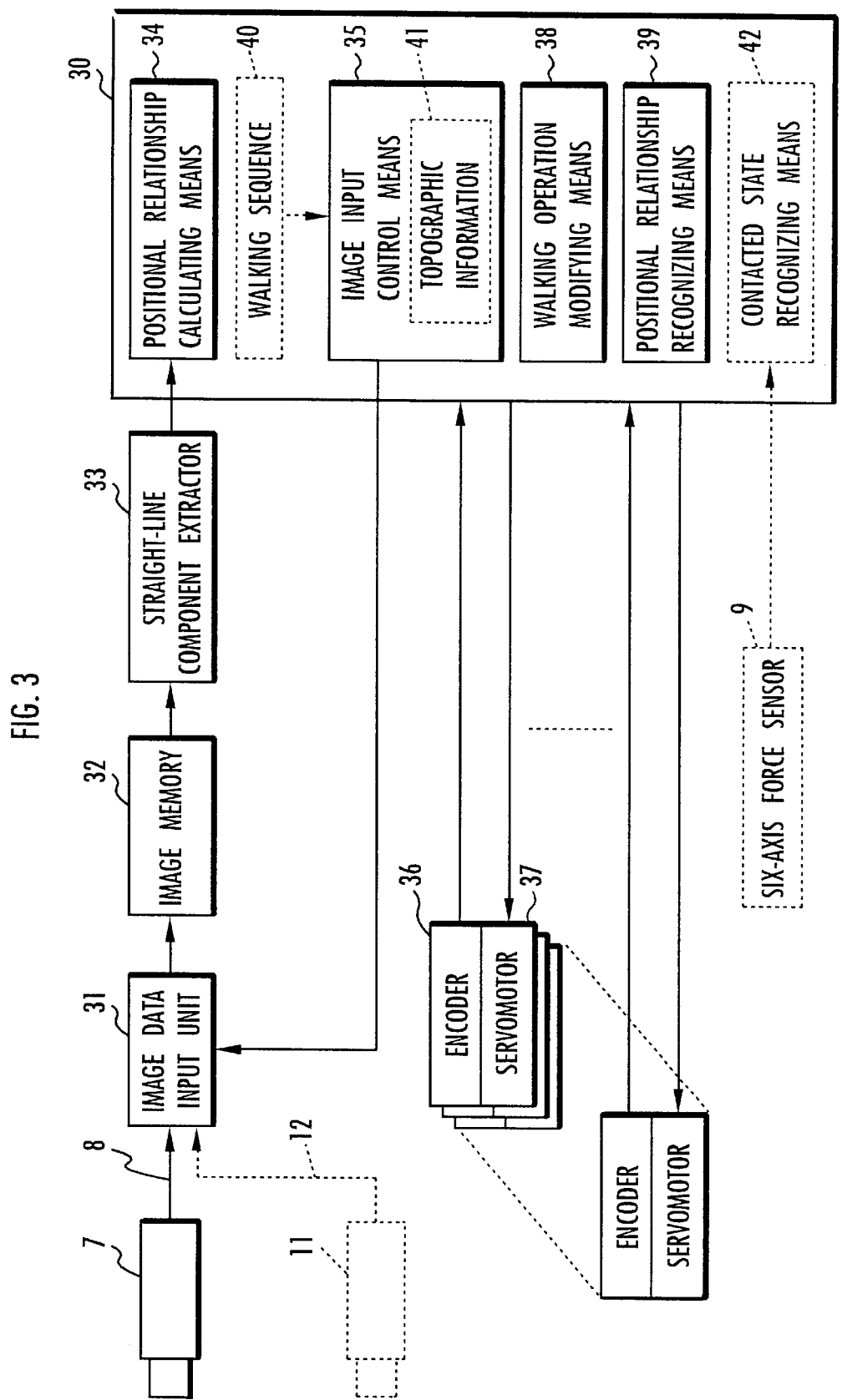
FIG. 3 is a block diagram of an arrangement for calculating the positional relationship between a portion of a leg of a robot and an obstacle.

As shown in FIGS. 2(a) through 2(h), the legged mobile robot 1 has an advantage over other types of robots such as wheeled robots in that it can negotiate three-dimensional objects such as a staircase 5 or the like. In order for the legged mobile robot 1 to walk up and down a staircase, the legged mobile robot 1 needs to accurately recognize the position of the staircase and control a foot 4, which is part of each of the legs, to be lifted off and landed on steps of the staircase. As shown in FIG. 3, the legged mobile robot 1 has an arrangement for calculating the positional relationship between an obstacle and the foot 4 from image data captured in the course of robot walking by the camera 7.

In FIG. 3, the legged mobile robot 1 has a controller 30 for controlling general operation thereof, the controller 30 comprising a CPU, a ROM, a RAM, etc. The controller 30 detects states (attitudes) of the joints with encoders 36 associated with the respective joints for thereby recognizing the posture of the legged mobile robot 1, and actuates servomotors 37 associated with the respective joints for thereby controlling the posture of the legged mobile robot 1.

An analog image signal outputted from the camera 7 is converted by an image data input unit 31 into digital data, which is stored in an image memory 32. A straight-line component extractor 33 processes the digital data stored in the image memory 32 to extract edge points thereof thereby to extract straight-line components present in the image data. The controller 30 includes a positional relationship calculating means 34 for calculating the position of an obstacle present in the course of robot walking from the coordinates of the straight-line components extracted by the linear component extractor 33.

The controller 30 recognizes the states of the joints of the legged mobile robot 1 based on output data from the encoders 36. Therefore, the positional relationship calculating means 34 can basically calculate the foot 4 of each leg 3 and an obstacle by calculating the position of the obstacle from the image data. However, in the case where the camera 7 is mounted on the base body 2 such as the head 6, as shown in FIG. 1, the position of the camera 7 with respect to the foot 4 as a reference suffers a variation due to accumulated positioning errors of the joints that are present between the foot 4 and the camera 7. Accordingly, the position of a staircase 5 (corresponding to an obstacle according to the present invention) calculated from the image data captured by the camera 7 also suffers a variation with respect to the foot 4, and hence the positional relationship between the foot 4 and the staircase 5 cannot accurately be calculated.

In view of the above shortcoming, the positional relationship calculating means 34 calculates a relative positional relationship between the foot 4 and the staircase 5 from image data 8 (see FIG. 1) containing an image "a", of part of the foot 5 and an image "b", of part of the staircase 5. When the relative positional relationship between the foot 4 and the staircase 5 is calculated from the same image data, since the variation in the position of the camera 7 with respect to the foot 4 is canceled, the positional relationship between the foot 4 and the staircase 5 can accurately be calculated.

The camera 7 mounted on the head 6 may not necessarily capture the image of the foot 4 at all times. For example, as shown in FIGS. 2(a) through 2(e), when the legged mobile robot 1 walks up the staircase 5, a knee 20 is positioned between the camera 7 and the foot 4, concealing the foot 4 from view within the visual field of the camera 7. At this time, image data captured by the camera 7 does not contain an image of the foot 4. As a result, a relative positional relationship between the foot 4 and the staircase 5 cannot be calculated from the same image data.

Furthermore, it takes a certain period of time until the positional relationship calculating means 34 calculates a relative positional relationship between the foot 4 and the staircase 5 after the camera 7 has captured image data. If the positional relationship calculating means 34 processes image data that does not contain an image of the foot 4, then a certain period of data processing time is wasted. Because of such a wasted period of data processing time, the positional relationship calculating means 34 may possibly fail to capture and process image data at such timing that both the foot 4 and the staircase 5 are present in the visual field of the camera 7.

To eliminate the above drawback, the controller 30 has a positional relationship recognizing means 39 for recognizing the positional relationship between the visual field of the camera 7 and the leg 3 of the legged mobile robot 1 from the output data from the encoders 36. When the positional relationship recognizing means 39 recognizes the positional relationship between the foot 4 and the camera 7 such that both the foot 4 and the staircase 5 can enter the visual field of the camera 7, an image input control means 35 of the controller 30 instructs the image data input unit 31 to capture image data from the camera 7.

Consequently, the straight-line component extractor 33 and the positional relationship calculating means 34 can process only image data that contains both images of the foot 4 and the staircase 5, and do not perform wasteful image processing as described above. The image input control means 35, the image data input unit 31, and the image memory 32 jointly serve as an image input means according to the present invention.

The positional relationship calculating means 34 calculates the positional relationship between the staircase 5 and the leg 3 at least once after the leg 3 is lifted off the staircase 5 and until the leg 3 is landed on the staircase 5. Therefore, the controller 30 can correct or modify the subsequent walking operation at short intervals of time for stabilizing the walking operation of the legged mobile robot 1.

Figure 4:
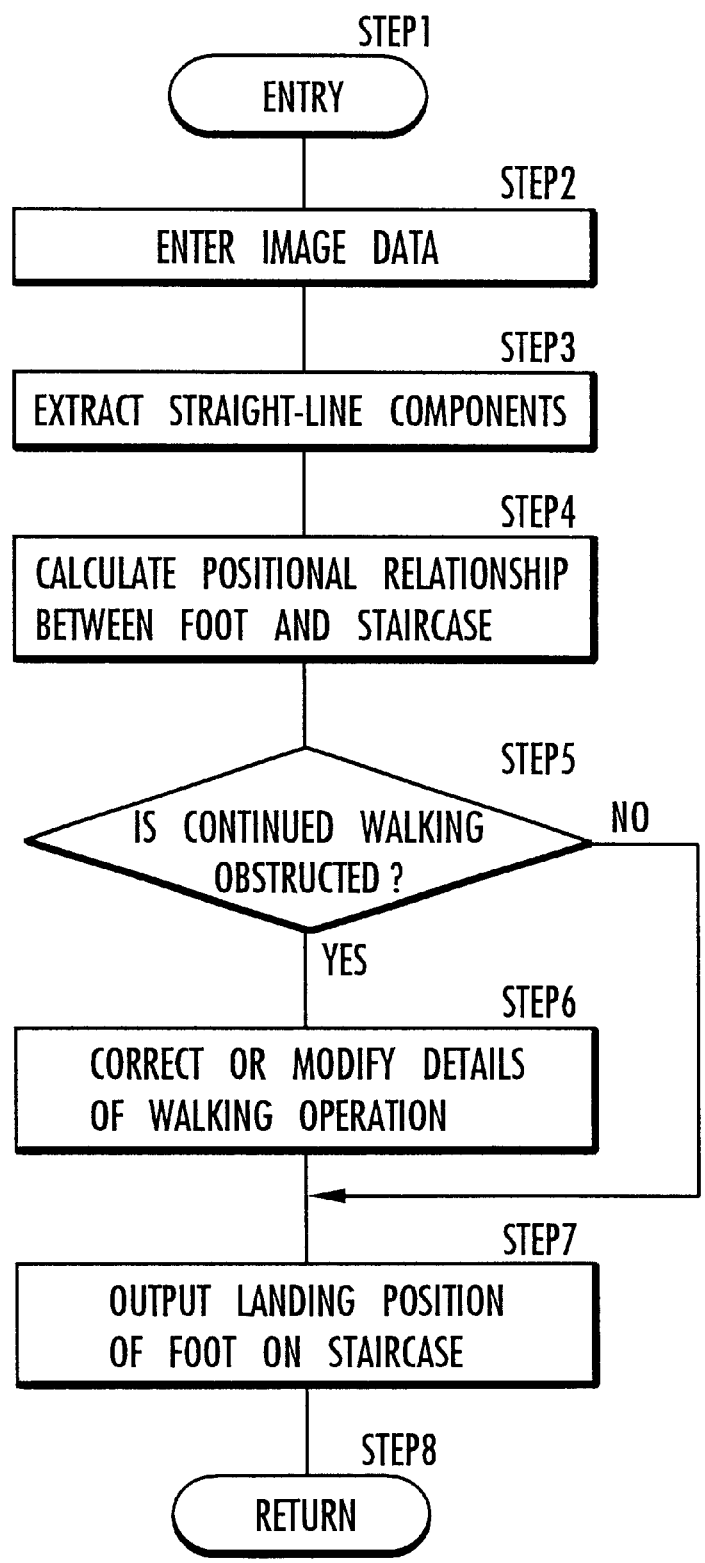
FIG. 4 is a flowchart of a process of outputting a landing position of a foot of the robot.

A process that is carried when the image input control means 35 instructs the image data input unit 31 to capture image data will be described below with reference to FIG. 4. When the process is started in STEP1, the image input unit 31 converts an analog image signal from the camera 7 into digital data, and stores the digital data into the image memory 32 in STEP2. Then, the straight-line component extractor 33 extracts straight-line components present in the image data stored in the image memory 32 by way of edge point extraction in STEP3.

In STEP4, the positional relationship calculating means 34 detects whether an obstacle is present or not from the coordinate data of the straight-line components extracted by the straight-line component extractor 33. If an obstacle is present, then the positional relationship calculating means 34 calculates the positional relationship between the foot 4 and the obstacle. Thereafter, a walking operation modifying means 38 of the controller 30 decides whether the position of the obstacle with respect to the foot 4 as calculated by the positional relationship calculating means 34 obstructs continued walking of the legged mobile robot 1 or not in STEP5. If the position of the obstacle with respect to the foot 4 is determined as obstructing continued walking of the legged mobile robot 1, then the walking operation modifying means 38 modifies details of the walking operation of the legged mobile robot 1 in STEP6.

Specifically, while the legged mobile robot 1 is walking up the staircase 5 according to a predetermined walking sequence with a predetermined walking speed and a predetermined leg stroke depending on the width of the steps of the staircase, if the landed position of the foot 4 is recognized as being displaced toward the edge of a step of the staircase 5 based on the positional relationship calculated by the positional relationship calculating means 34, then the walking operation modifying means 38 modifies the walking operation of the legged mobile robot 1 in order to slightly increase the leg stroke when the other foot is to be lifted off or landed on the staircase 5 next time.

In STEP7, the walking operation modifying means 38 outputs a landing position of the foot 4 on the staircase 5 according to the modified walking operation to a motor controller (not shown). The motor controller controls the motors of the leg to cause the legged mobile robot 1 to walk at the modified leg stroke for thereby enabling the foot 4 to be landed on the center of a step of the staircase 5 next time.

Consequently, the walking operation of the legged mobile robot 1 as it walks up the staircase 5 is corrected or modified by the walking operation modifying means 38 depending on the landed position or direction of the foot 4. As a result, the legged mobile robot 1 can stably walk up the staircase 5 without stepping off the staircase 5 or going in wrong directions. The walking operation of the legged mobile robot 1 can also be similarly corrected or modified by the walking operation modifying means 38 when the legged mobile robot 1 walks down the staircase 5.

If the position of the obstacle with respect to the foot 4 is determined as not obstructing continued walking of the legged mobile robot 1 in STEP5, then the walking operation modifying means 38 does not correct or modify details of the walking operation of the legged mobile robot 1, and outputs a landing position of the foot 4 on the staircase 5 according to the predetermined walking sequence to the motor controllers (not shown) in STEP 7.

In the illustrated embodiment, the image input control means 35 recognizes the posture of the legged mobile robot 1 from output data from the encoders 36 of the respective joints. However, a tilt sensor 10 (see FIG. 1) for detecting a tilt of the base body 2 from the vertical direction may be mounted in the base body 2, and the posture of the legged mobile robot 1 may be recognized in view of output data from the tilt sensor 10. Furthermore, the posture of the legged mobile robot 1 may be recognized in view of commands sent from the controller 30 to the servomotors 37.

In the illustrated embodiment, the image input control means 35 instructs the image data input unit 31 to capture the image data 8 from the camera 7 when both the foot 4 and the obstacle can enter the visual field of the camera 7. However, if the walking operation of the legged mobile robot 1 is controlled according to a predetermined walking sequence 40 (see FIG. 3), the image input control means 35 can grasp in advance the time at which both the foot 4 and the obstacle enter the visual field of the camera 7, from the walking sequence 40. Therefore, the image input control means 35 may instruct the image data input unit 31 to capture the image data 8 when the grasped time is reached.

As shown in FIG. 3, the image input control means 35 may hold in advance topographic information 41 in the course of robot walking. Based on the topographic information 41 thus held by the image input control means 35, the image input control means 35 can predict an area where an obstacle will enter the visual field of the camera 7 when the legged mobile robot 7 is walking. When the area is reached, the image input control means 35 may instruct the image data input unit 31 to capture the image data 8. In this manner, the possibility that the image data 8 is captured before an obstacle enters the visual field of the camera 7 and the straight-line component extractor 33 and the positional relationship calculating means 34 perform wasteful image processing is reduced.

As shown in FIG. 3, a camera 11 (corresponding to an auxiliary vision sensor according to the present invention) having a wider visual field than the camera 7 may be employed, and the image input control means 35 may recognize whether there is an obstacle in the course of robot walking from image data 12 captured by the camera 11. With the camera 11 used, when the legged mobile robot 1 reaches an area where an obstacle enters the visual field of the camera 7, the image input control means 35 instructs the image data input unit 31 to capture the image data 8. In this manner, the possibility that the image data 8 is captured before an obstacle enters the visual field of the camera 7 and the straight-line component extractor 33 and the positional relationship calculating means 34 perform wasteful image processing is reduced.

The camera 7 may comprise a compound-eye camera to obtain distance information between the foot 4 and an obstacle based on the three-dimensional vision of the compound-eye camera. Alternatively, the camera 7 may incorporate a zoom lens whose magnification can be controlled to have both the foot 4 and an obstacle enter the visual field of the camera 7.

In the above embodiment, straight-line components are extracted from the image data 8 to calculate the positions of the foot 4 and the staircase 5. However, straight lines of edges of the foot 5 and the staircase 5 may not be extracted accurately because of the relationship between the color of the foot 4 and the color of the surface on which the foot 4 is landed, and also illuminating conditions. To avoid this drawback, as shown in FIG. 1, a mark "m", may be applied to the foot 4, and an edge of the mark "m", may be extracted from the image data 8 thereby to calculate the position of the foot 4. In this case, the controller 30 needs to recognize in advance the positional relationship between edges of the mark "m", and the foot 4.

A mark may also be applied to the staircase 5, and an edge of the mark may be extracted from the image data thereby to calculate the position of the staircase 5. In this case, the controller 30 needs to recognize in advance the positional relationship between edges of the mark and the staircase 5. With the mark thus applied to the foot 4 or the staircase 5, the positional relationship between the foot 4 and the staircase 5 can be calculated highly accurately from the edge of the mark regardless of the relationship between the color of the foot 4 and the color of the surface on which the foot 4 is landed, and the illuminating conditions.

While the legged mobile robot 1 is walking up or down the staircase 5, if the camera 7 malfunctions or foreign matter is applied to the camera 7 impairing the visual field thereof, then the image data 8 containing images of the foot 4 and the staircase 5 cannot be captured by the camera 7. When this happens, the walking operation of the legged mobile robot 1 may be interrupted depending on how long the malfunctioning of the camera 7 continues. Alternatively, as shown in FIG. 3, a six-axis force sensor 9 (corresponding to a force sensor according to the present invention) and a contacted state recognizing means 42 for recognizing the direction and position in which the foot 4 is in contact with an edge (ridge) of the staircase 5 may be provided, and the positional relationship between the staircase 5 and the leg 3 may be recognized from the direction and position in which the foot 4 is in contact with the edge of the staircase 5 as recognized by the contacted state recognizing means 42, for continuing the walking operation of the legged mobile robot 1.

Figure 5:
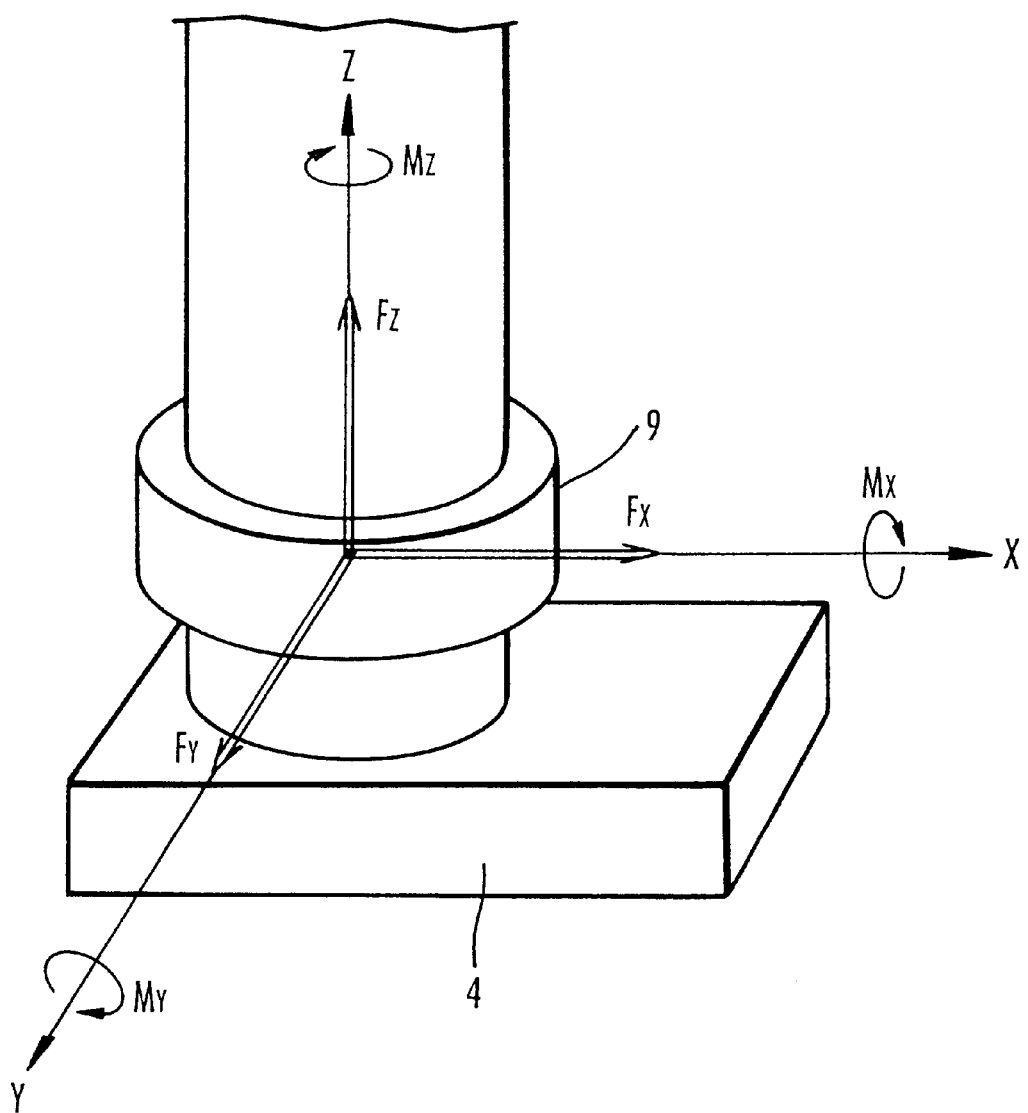
FIG. 5 is a fragmentary perspective view illustrative of the function of a six-axis force sensor.

As shown in FIG. 5, the six-axis force sensor 9 serves to detect acting forces $F_X$, $F_Y$, $F_Z$ along respective axes X, Y, Z based on resistive forces applied to the foot 4 from the surface contacted by the foot 4, and moments $M_X$, $M_Y$, $M_Z$ about the respective axes X, Y, Z. According to the technique disclosed in Japanese laid-open patent publication No. 11-10562 filed by the present applicant, when the foot 4 of the robot 1 contacts an edge of the staircase 5, the foot 4 is tilted to the left and right along the edge, and the positions on the sole of the foot 4 of centers of resistive forces applied to the foot 4 from the edge in the respective tilted positions are calculated from output data from the six-axis force sensor 9 in the respective tilted positions. The direction and position in which the foot 4 is in contact with the edge of the staircase 5 can be recognized on the basis of the calculated positions of the centers of the resistive forces in the respective tilted positions.

Using the above disclosed technique, the contacted state recognizing means 42 recognizes the direction and position in which the foot 4 is in contact with the edge of the staircase 5. The controller 30 then recognizes the positional relationship between the staircase 5 and the leg 3 from the direction and position in which the foot 4 is in contact with the edge of the staircase 5 as recognized by the contacted state recognizing means 42.

Therefore, even if the camera 7 malfunctions while the legged mobile robot 1 is walking up or down the staircase 5, the legged mobile robot 1 can recognize the positional relationship between the staircase 5 and the leg 3 and continue to walk up or down the staircase 5 while correcting the position in which the foot 4 contacts the staircase 5. Another force sensor different from the six-axis force sensor 9 may be used insofar as it is capable of detecting the acting forces and the moments described above. The contacted state recognizing means 42 may recognize either one of the direction and position in which the foot 4 is in contact with the edge of the staircase 5 for the controller 30 to recognize the positional relationship between the staircase 5 and the foot 4.

In the illustrated embodiment, the camera 7 is mounted on the head 6 of the base body 2. However, the camera 7 may be mounted on another portion of the base body 2, e.g., the chest of the base body 2. The positional relationship between the foot 4, as a portion of the leg 3, and an obstacle is calculated in the above embodiment. However, the positional relationship between another portion of the leg 3, e.g., the knee, and an obstacle may instead be calculated.

Although a certain preferred embodiment of the present invention has been shown and described in detail, it should be understood that various changes and modifications may be made therein without departing from the scope of the appended claims.

What is claimed is:

1. A legged mobile robot comprising:

a base body;

a plurality of legs operatively connected to said base body;

a vision sensor mounted on said base body;

image input means for capturing image data via said vision sensor;

positional relationship calculating means for calculating the positional relationship between of an obstacle present in the course of robot walking and one of said legs from the image data captured by said image input means, so that the legged mobile robot can walk while recognizing the positional relationship between the obstacle and the leg as calculated by said positional relationship calculating means;

said positional relationship calculating means comprising means for calculating positional relationship between the obstacle and the leg from image data containing both images of a portion of the leg and the obstacle as captured by said image input means.

2. A legged mobile robot according to claim 1, further comprising:

positional relationship recognizing means for recognizing the positional relationship between a visual field of said vision sensor and said leg, said image input means comprising means for capturing the image data via said vision sensor when both said portion of the leg and the obstacle enter the visual field of said vision sensor as determined by said positional relationship recognizing means.

3. A legged mobile robot according to claim 1, further comprising:

walking operation modifying means for modifying details of subsequent walking operation of the legged mobile robot depending on the positional relationship between said leg and the obstacle as calculated by said positional relationship calculating means.

4. A legged mobile robot according to claim 3, wherein said positional relationship calculating means comprises means for calculating the positional relationship between said leg and the obstacle at least once after said leg is lifted and until said leg is landed during walking operation of the legged mobile robot.

5. A legged mobile robot according to claim 1, wherein said image input means comprises means for holding topographic information in advance and means for capturing the image data via said vision sensor when an area in which the obstacle is expected to enter the visual field of said vision sensor is reached based on the topographic information during walking operation of the legged mobile robot.

6. A legged mobile robot according to claim 1, wherein said leg has a mark on a portion thereof which can enter the visual field of said vision sensor, said positional relationship calculating means comprising means for extracting an edge of said mark from said image data thereby to calculate the position of said leg.

7. A legged mobile robot according to claim 1, further comprising:

an auxiliary vision sensor having a visual field wider than a visual field of said vision sensor;

said image input means comprising means for entering topographic image data in the course of robot walking via said auxiliary vision sensor, recognizing the position of the obstacle from said topographic image data, and capturing the image data via said vision sensor when an area in which the obstacle enters the visual field of said vision sensor is reached.

8. A legged mobile robot according to claim 1, wherein said leg has a foot for contacting a floor, further comprising:

a force sensor for detecting an acting force and a moment in a predetermined direction based on a resistive force applied to said foot from the floor; and contacted state recognizing means for recognizing a direction and/or position in which said foot contacts a ridge of the obstacle, based on output data from said force sensor;

wherein if said image input means fails to capture the image data via said vision sensor, the legged mobile robot walks while recognizing the positional relationship between the obstacle and the leg from the direction and/or position in which said foot contacts the ridge of the obstacle, as recognized by said contacted state recognizing means.

* * * * *